(12) United States Patent
Gao et al.

(10) Patent No.: US 9,442,292 B1
(45) Date of Patent: Sep. 13, 2016

(54) DIRECTIONAL ARRAY SENSING MODULE (71) Applicant: Google Inc., Mountain View, CA (US)

(72) Inventors: Lu Gao, San Jose, CA (US); Xiaoyu Miao, Palo Alto, CA (US); Xi Chen, San Jose, CA (US)

(73) Assignee: Google Inc., Mountain View, CA (US)

( * ) Notice: Subject to any disclaimer, the term of this patent is extended or adjusted under 35 U.S.C. 154(b) by 4 days.

(21) Appl. No.: 14/182,992

(22) Filed: Feb. 18, 2014

(51) Int. Cl.
*G02B 27/01* (2006.01)
*G06F 3/01* (2006.01)

(52) U.S. Cl.
CPC .......... *G02B 27/0172* (2013.01); *G06F 3/013* (2013.01)

(58) Field of Classification Search
None
See application file for complete search history.

(56) References Cited

U.S. PATENT DOCUMENTS

| | | | |
|---|---|---|---|
| 8,135,227 B2 * | 3/2012 | Lewis et al. | 382/254 |
| 8,550,628 B2 | 10/2013 | Durnell et al. | |
| 2011/0164294 A1 * | 7/2011 | Shimizu | 359/13 |
| 2012/0294478 A1 * | 11/2012 | Publicover et al. | 382/103 |
| 2013/0044055 A1 * | 2/2013 | Karmarkar et al. | 345/158 |
| 2013/0208014 A1 | 8/2013 | Fleck et al. | |
| 2014/0071400 A1 * | 3/2014 | Gao | 351/210 |

FOREIGN PATENT DOCUMENTS

| WO | WO-2011060525 | 5/2011 |
|---|---|---|
| WO | WO-2013112705 | 8/2013 |

* cited by examiner

*Primary Examiner* — Nicholas Lee
*Assistant Examiner* — Duane N Taylor, Jr.
(74) *Attorney, Agent, or Firm* — Blakely Sokoloff Taylor & Zafman LLP (57) ABSTRACT

Embodiments describe an eye sensing module to detect eye movements and gestures. The eye sensing module is included in a head wearable display, and may be placed anywhere within the head wearable display so that the image sensor device has a line-of-sight to the user's eye. The eye sensing module comprises an image sensor, an array of focusing lenses disposed over the image sensor placed side-by-side (i.e., not on top of one another), and a corresponding array of directional prisms disposed over the focusing lenses. The directional prisms and the focusing lenses increase the field of view of the image sensor to enable the image sensor to capture eye gestures and eye movements for different user eye sizes, eye locations, and other varying eye characteristics. These eye sensing modules increase the field of view of the image sensor without increasing the size of image sensor or focusing lenses.

22 Claims, 7 Drawing Sheets

DIRECTIONAL ARRAY SENSING MODULE

TECHNICAL FIELD

Embodiments of the disclosure relate to the field of computing devices, and more particularly, to head wearable displays.

BACKGROUND

A head wearable display is a display device worn on or about the head of a user. head wearable displays usually incorporate some sort of near-to-eye optical system to display an image within a few centimeters of the human eye. Single eye displays are referred to as monocular head wearable displays while dual eye displays are referred to as binocular head wearable displays. Some head wearable displays display only a computer generated image (CGI), while other types of head wearable displays are capable of superimposing CGI over a real-world view. The former type of head wearable display is often referred to as virtual reality (VR) while latter type of head wearable display is often referred to as augmented reality (AR) because the viewer's image of the world is augmented with an overlaying CGI, also referred to as a heads-up display (HUD).

Head wearable displays may utilize eye sensing modules to capture image data of an eye of a user. This image data may be used to detect user eye movements, gaze directions, or eye gestures (such as an eye blink or wink). For a head wearable display designed to be worn by a variety of users, these eye sensing modules must accommodate a variety of user eye sizes and locations (i.e., eye regions).

BRIEF DESCRIPTION OF THE DRAWINGS

The present disclosure will be understood more fully from the detailed description given below and from the accompanying drawings of various embodiments of the disclosure, which, however, should not be taken to limit the invention to the specific embodiments, but are for explanation and understanding only.

DETAILED DESCRIPTION

Embodiments of an apparatus, system and method for utilizing eye sensing modules for detecting eye movements and gestures are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
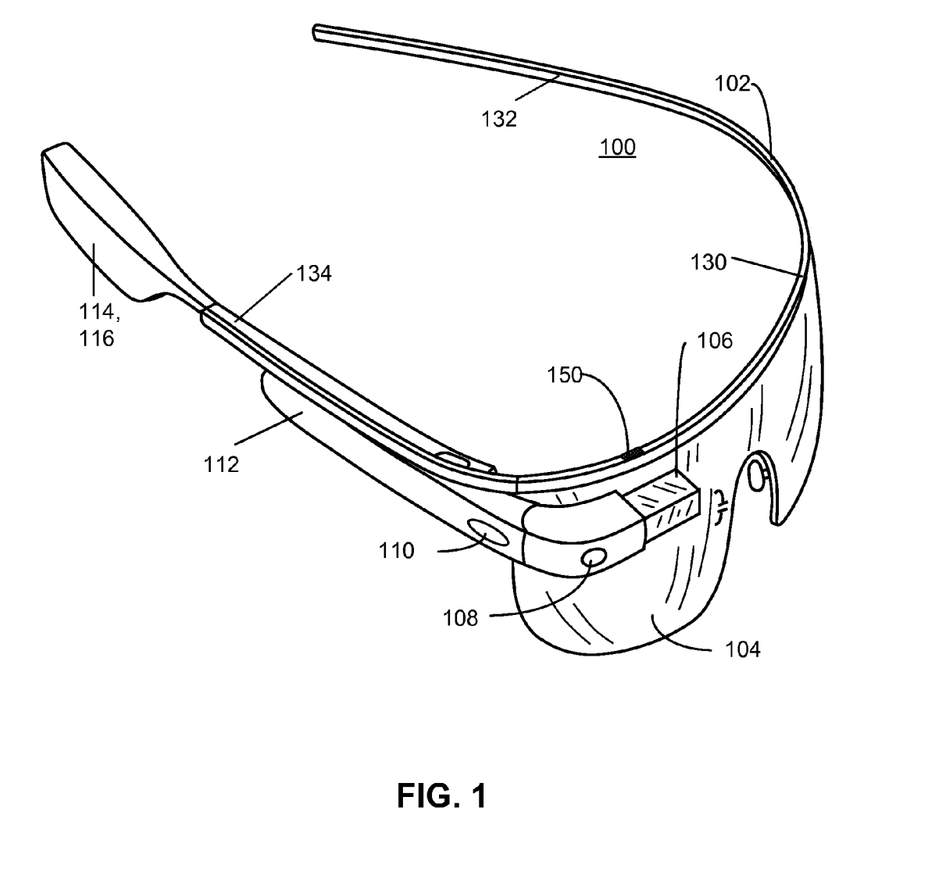
FIG. 1 is an illustration of a head wearable display according to an embodiment of the disclosure.

FIG. 1 is an illustration of an head wearable display according to an embodiment of the disclosure. head wearable display 100 is illustrated as a wearable computing device in an eyeglasses frame form; in other embodiments, head wearable displays may comprise other form factors for providing a near-to-eye optical display for a user.

In this embodiment, frame 102 of head wearable display 100 includes center frame support 130 to support lens element 104, and extending side-arms 132 and 134. Center frame support 130 and side-arms 132 and 134 are configured to secure frame 102 to the head of a user via the user's nose and ears, respectively. Center frame support 130 and extending side-arms 132 and 134 may be formed of a solid structure of plastic or metal, or may be formed of a hollow structure of similar material so as to allow wiring and component interconnects to be internally routed through the frame. Alternatively or additionally, frame 102 may support external wiring.

In this embodiment, lens element 104 is at least partially transparent so as to allow the user to look through them so that head wearable display 100 may provide an augmented reality (AR) to the user (i.e., because the user's image of the world is augmented with an overlaying CGI, also referred to as a heads-up display (HUD)). Optical system 106 is illustrated as being positioned in front of lens 104, and thus head wearable display 100 comprises a single-eye display (i.e., a monocular head wearable display); other embodiments may comprise a dual-eye display (i.e., a binocular head wearable display).

Head wearable display 100 may include an internal processor to process data from, among other sources, various sensors including camera 108 when determining the virtual image that should be displayed to the user. head wearable display 100 may include a touchpad used as a user input/output (I/O) interface (not shown) placed on either of side arms 132 and 134; in some embodiments, microphone 110 may also be used to capture voice input commands, and camera 108 may be used to capture user gesture based commands.

In this embodiment, camera 108 is shown to be located near optical system 106. Alternatively, camera 108 may be located elsewhere on frame 102, located separately from head wearable display 100, or be integrated into optical system 106. Camera 108 may image a field of view similar to what the user may see. Furthermore, camera 108 may allow for the processor of head wearable display 100 to interpret objects within the field of view and display context-sensitive virtual images. For example, if the camera 108 and the head wearable display processor capture image data and identify a target object, the system could alert the user by displaying an overlaid artificial image designed to draw the user's attention to the target object. These images could move depending upon the user's field of view or target object movement—i.e. user head or target object movements may result in the artificial images moving around the viewable area to sense the relative motion; furthermore, user eye movements, sensed via the eye sensing modules described below, may also result in the artificial images moving around the viewable area to sense the relative motion.

Optical system 106 may further display instructions, location cues and other visual cues to enhance interaction with the target object. Camera 108 could be an autofocus camera that provides an autofocus signal. The head wearable display processor may adjust the length of the optical paths of optical system 106 based on the autofocus signal in order to present virtual images that correspond to the environment.

Head wearable display 100 may further include additional computing components and other I/O means (e.g., a motion sensor to detect head movement gestures as user input commands, audio speakers to output audio data to the user, etc.). head wearable display 100 is shown to further include speaker 112, processor 114 and power supply 116 to supply power to the head wearable display and its components. Not all components of head wearable display 100 are illustrated; for example, some embodiments may include, for example, connectivity components and location sensors. Connectivity components may comprise components for either or both of cellular and wireless connectivity. As referred to herein, cellular connectivity refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. As referred to herein, wireless connectivity refers to wireless connectivity that is not cellular, and can include personal area networks (such as Bluetooth), local area networks (such as Wi-Fi), and/or wide area networks (such as Wi-Max), or other wireless communication. Locations sensors may utilize the above described connectivity components (e.g., for Wi-Fi or cellular triangulation based processes) or may include other components such as a Global Positioning System (GPS) sensor.

Head wearable display 100 is further shown to include eye sensing module 150 to acquire eye images (e.g., video images) of the user's eye. These eye images are used to detect user eye movements (e.g., iris movements or eye muscle movements, such as a wink). Eye sensing module 150 may be oriented to face the eye of the user or any other orientation so that a field of view of the eye sensing module is able to include the eye of the user. As illustrated in this embodiment, eye sensing module 150 is inward facing across from an expected position of the user's eye. In other embodiments, the eye sensing module may be placed on any other portion of frame 102, or may be separate from frame 102. Furthermore, any number of eye sensing modules may be used in other embodiments. Eye sensing module 150 may be any type of sensor such as a camera to capture an image of the eye, a motion sensing device, etc.

Data captured by eye sensing module 150 may be used to sense user eye movements, gaze directions, or eye gestures (such as an eye blink or wink). For example, an eye-sensing algorithm may sense a position of a user's eye within an eyebox, determine the interpupillary distance (IPD) between the center of the pupils of a user's eyes (e.g., for calibration of binocular displays), determine a line of sight of the user's eye or eyes, or determine any other eye-position parameters related to a user's eye or eyes.

In one embodiment, the iris location of a user's eye (or alternatively, the relative location of pupil with respect to eye position) may be analyzed to generate gaze direction information, which can be used to determine the user's gazing direction—i.e., "lock on" an item the user is currently gazing or staring. The gaze direction information can be correlated to the scene images acquired by camera 108 to determine what item the user is looking at when viewing the external scene and augmented content via lens 104. The gaze direction information may also be correlated with the CGI displayed to via optical system 106 to determine what portion of the CGI (e.g., an icon or any other selectable item) the user is looking at.

In situations in which the systems discussed herein collect information specific to a user of a head wearable device, or may make use of personal information, the user may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, any collected or stored data related to the user may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 2:
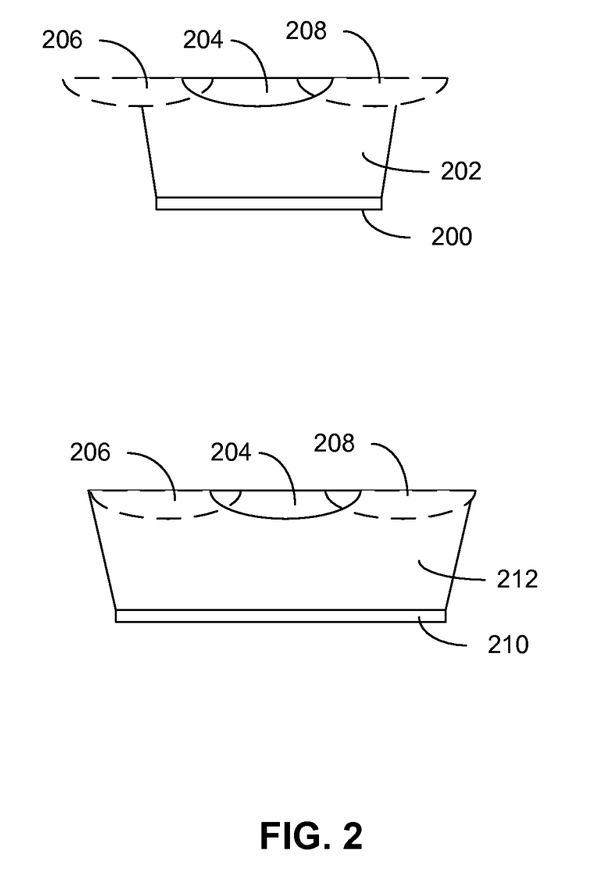
FIG. 2 is an illustration of eye sensing modules according to embodiments of the disclosure.

For head wearable displays designed to be used by a variety of users, an eye sensing module able to accommodate a large amount of variation in eye size, shape and position is needed. FIG. 2 is an illustration of eye sensing modules according to embodiments of the disclosure. For eye sensing module 200, the size of the sensor may not be adequate to produce a field of view capable of accommodating user eye variations. For example, field of view 202 of module 200 illustrates that the module is capable sensing all user eye movements when the user's eye is in position 204, but not all eye movements when the user's eye is positioned away from the center (e.g., laterally or vertically) of the module, such as position 206 and 208.

The field of view of an eye sensing module can be increased by either moving the eye sensing module further back from the eye or increasing the eye sensing module size; however, this solution correspondingly deteriorates the signal-to-noise ratio. Module 210 is shown to have an increased width (i.e., compared to module 200) to generate field of view 212 capable of accommodating user eye positions 204, 206 and 208; however, the region of interest (i.e., the region in the field of view occupied by the user's eye) is only a small portion of the light detected by module 210, thereby creating a poor signal-to-noise ratio.

Figure 3:
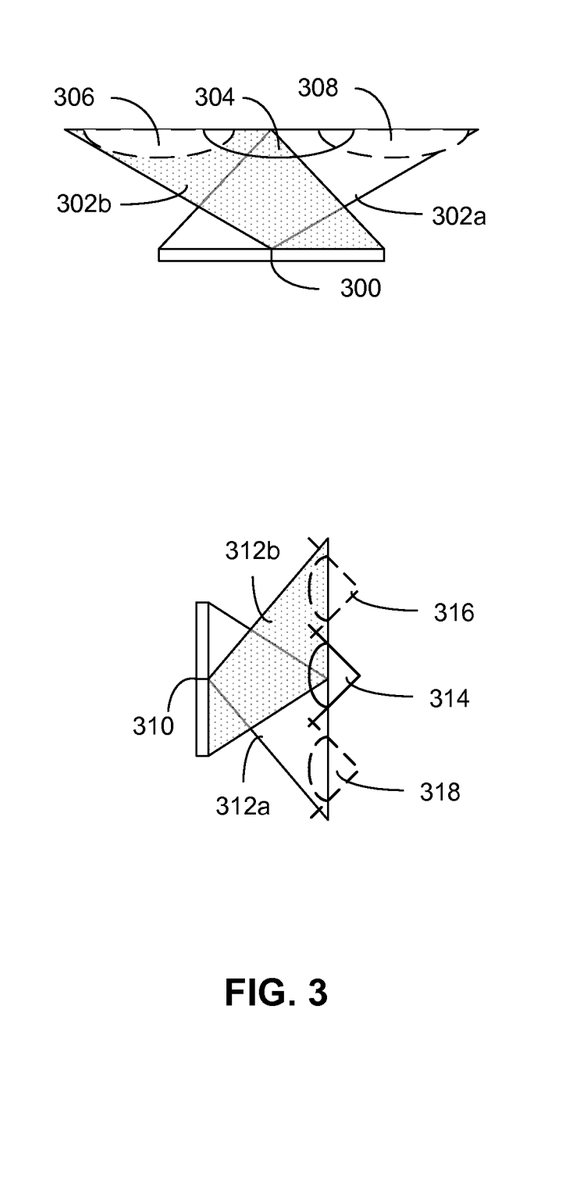
FIG. 3 is an illustration of eye sensing modules according to embodiments of the disclosure.

Embodiments of the disclosure discussed below describe an eye sensing module able to accommodate a large amount of variation in eye size, shape and position without increasing the signal-to-noise ratio of the captured sensor data. FIG. 3 is an illustration of eye sensing modules according to embodiments of the disclosure. In this embodiment, eye sensing module 300 is shown to have an increased field of view (shown as a combination of regions 302a and 302b) capable of accommodating user eye positions 304, 306 and 308. As described in further detail below, eye sensing module 300 utilizes a plurality of focusing lenses and directional prisms to increase the field of view of module 300, as opposed to increasing the sensor size or sensor distance from the user's eye.

Eye sensing module 300 is shown to have a "wide" the field of view to accommodate varying lateral eye positions 304, 306 and 308. Other embodiments may increase the field of view to accommodate varying vertical eye positions. Eye sensing module 310 is shown to have an increased field of view (shown as a combination of regions 312a and 312b)

capable of accommodating user eye positions 314, 316 and 318. Other embodiments may utilize a plurality of focusing lenses and directional prisms to increase the field of view of an eye sensing module in both laterally and vertically.

Thus, for both eye sensing modules 300 and 310, the optical sensor capture at least two images; for module 300, image data corresponding to both field of view 302a and 302b is captured. Embodiments of the disclosure may discard a subset of the captured image data in order to improve the signal-to-noise ratio the captured data. For example, assuming that the user' eye position is at position 306, the image data corresponding to field of view 302a contains no image data of the object of interest (e.g., the user's eye, or a portion of the user's eye such as the iris or pupil used to determine the direction of the user's gaze). Embodiments may discard such image data so that the signal-to-noise ratio of the collected data is not increased due to image data not including the object of interest. These selective discarding operations may also be applied to an exemplary situation where the user's eye position is at position 304, but a portion of the user's eye such as the iris or pupil is only visible in one of field of views 302a or 302b, or any other similar scenario.

Figure 4:
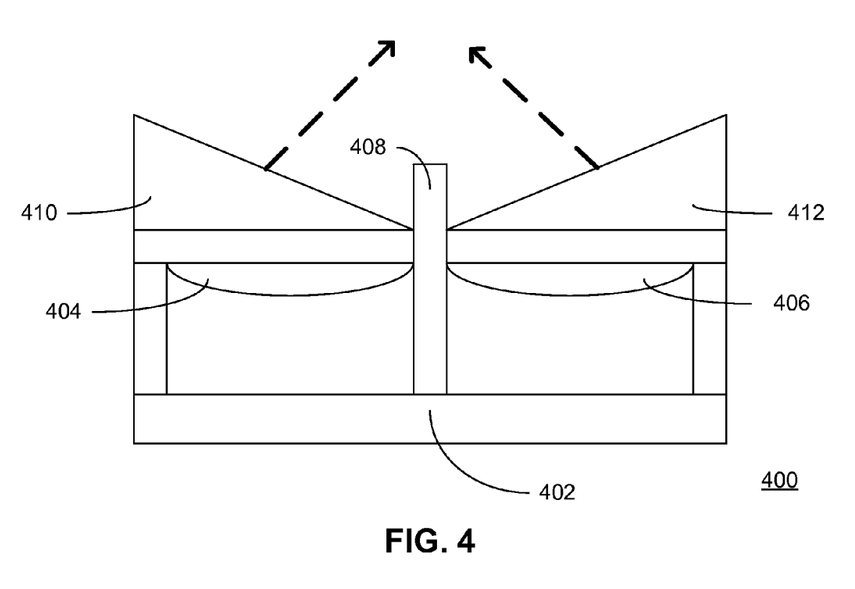
FIG. 4 is an illustration of components of an eye sensing module according to an embodiment of the disclosure.

FIG. 4 is an illustration of components of an eye sensing module according to an embodiment of the disclosure. Eye sensing module 400 is shown to include image sensor 402, focusing lenses 404 and 406 separated by spacer 408, and directional prisms 410 and 412. In this embodiment, the array of directional prisms are shown horizontally increase the field of view for the array of focusing lenses, and thus for image sensor 402. In other embodiments, directional prisms may be used to vertically increase the field of view for an image sensor. Furthermore, other embodiments may utilize more than two focusing lenses and directional prisms to increase the field of view both horizontally and vertically. Eye sensing module 400 is shown to include image sensor 402; however, in other embodiments, multiple image sensors may be used. For example, other embodiments may include separate image sensors corresponding to each focusing lens and directional prism used in the eye sensing module. Eye sensing module 400 may be included in an head wearable display and positioned in front of a user's eye to capture sensor data of the user's eye.

Focusing lens 404 and 406 are disposed over the image sensor, and directional prisms 410 (disposed over lens 404) and 412 (disposed over lens 406) are used to tilt the field of view of their respective lens to focus on the user's eye at different angles. In combination, this tilted field of view is greater than the field of view created by focusing lenses 404 and 406 alone. Thus, potentially two images of the user's eye are captured to eliminate stray light and focus the amount of object data captured by the sensor (or sensors). In some scenarios, multiple image data is captured for the same object of interest; however in some scenarios, the object of interest only appears in a subset of the captured image data. Embodiments of the disclosure may discard a subset of the captured image data in order to improve the signal-to-noise ratio the captured data.

Thus, embodiments describe an eye sensing module to detect eye movements and gestures. The eye sensing module may be included in an head wearable display, and may be placed anywhere within the head wearable display so that the image sensor device has a line-of-sight to the user's eye. The eye sensing module comprises an image sensor, an array of focusing lenses disposed over the image sensor aligned horizontally or vertically (i.e., side-by-side and not on top of one another), and a corresponding array of directional prisms disposed over the focusing lenses. The directional prisms and the focusing lenses increase the field of view of the image sensor to enable the image sensor to capture eye gestures and eye movements for different user eye sizes, eye locations (i.e., eye regions), and other varying eye characteristics. These eye sensing modules increase the field of view of the image sensor without increasing the size of the image sensor or focusing lenses.

Figure 5:
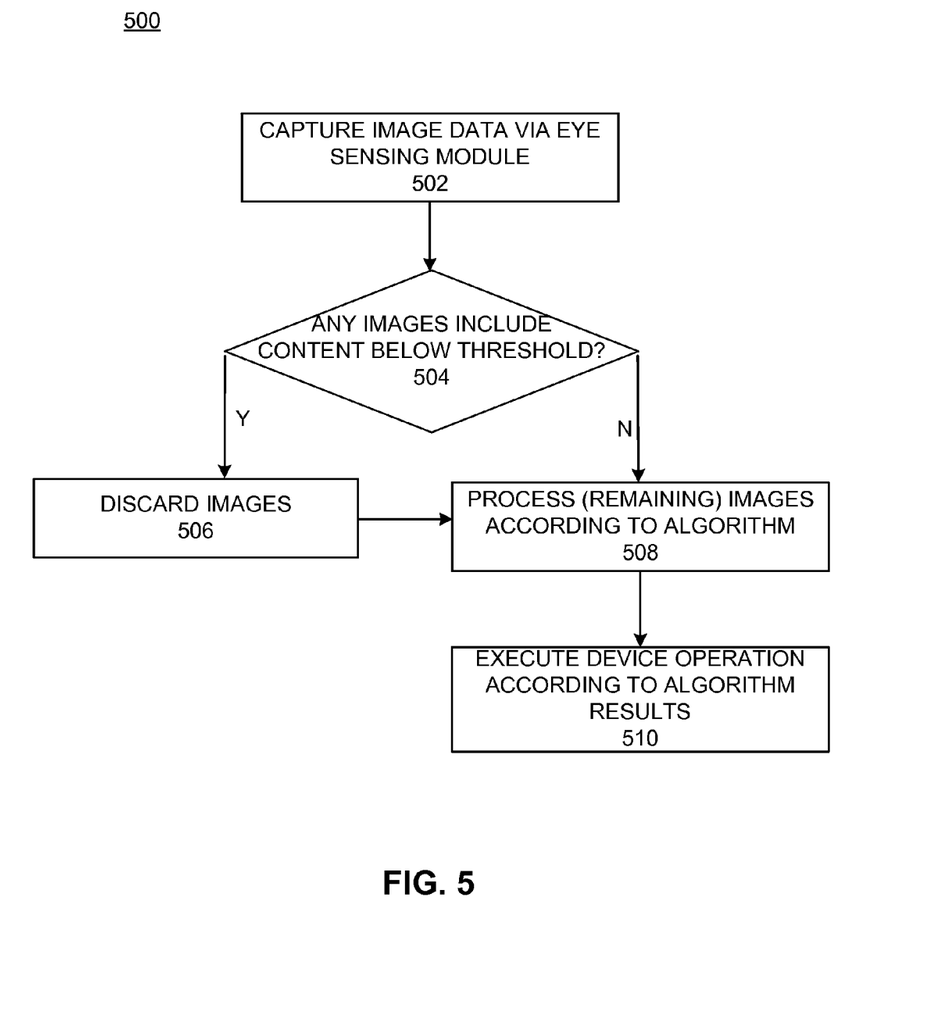
FIG. 5 is a flow diagram for processing sensor data from an eye sensing module according to an embodiment of the disclosure.

FIG. 5 is a flow diagram for processing sensor data from an eye sensing module according to an embodiment of the disclosure. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the disclosure; thus, not all actions are required in every implementation. Other process flows are possible.

Process 500 includes operations for capturing image data via an eye sensing module included in an head wearable display, 502. Said eye sensing module may comprise any of the exemplary embodiments described above, wherein multiple images are captured from different fields of view generated by a plurality of directional prisms and focusing lenses. The operation to capture image data of a user's eye may be in response to an application operation or a user command. For example, an operation related to an item the user is looking at when viewing an external scene and/or CGI augmented content may utilize image data of the user's eye to determine gaze direction information; said gaze direction information may be subsequently used to identify said item.

Eye sensing modules according to the embodiments described above utilize an increased field of view to accommodate a variety of user eye sizes and eye positions. As described above, one or more of the plurality of images captured via the eye sensing module may not include sufficient data of an object of interest. For example, eye sensing processes may interpret a user blink as a gesture (i.e., interpreting a blinking motion as a gesture), and thus any images of the user's eye may be utilized for detecting this eye motion. Other eye sensing processes, such as determining the current gaze direction of a user, may utilize image data of a portion of the user's eye (e.g., the iris or pupil) that may not be present in some of the plurality of images. Any image that does not meet the appropriate threshold (e.g., images that do not include the user's eye, or a specified portion of the user's eye) are identified, 504 and discarded, 506.

The (remaining) images are processed accordingly, 508, and a corresponding head wearable display operation is executed, 510. For example, identifying a direction of the user's gaze may be used to move one or more displayed objects when a user's eye movement moves the object away from the field of view. In another example, an head wearable display may display a plurality of icons at a position corresponding to the user's gaze direction, and user eye movements may be interpreted as selecting one of the icons.

Figure 6:
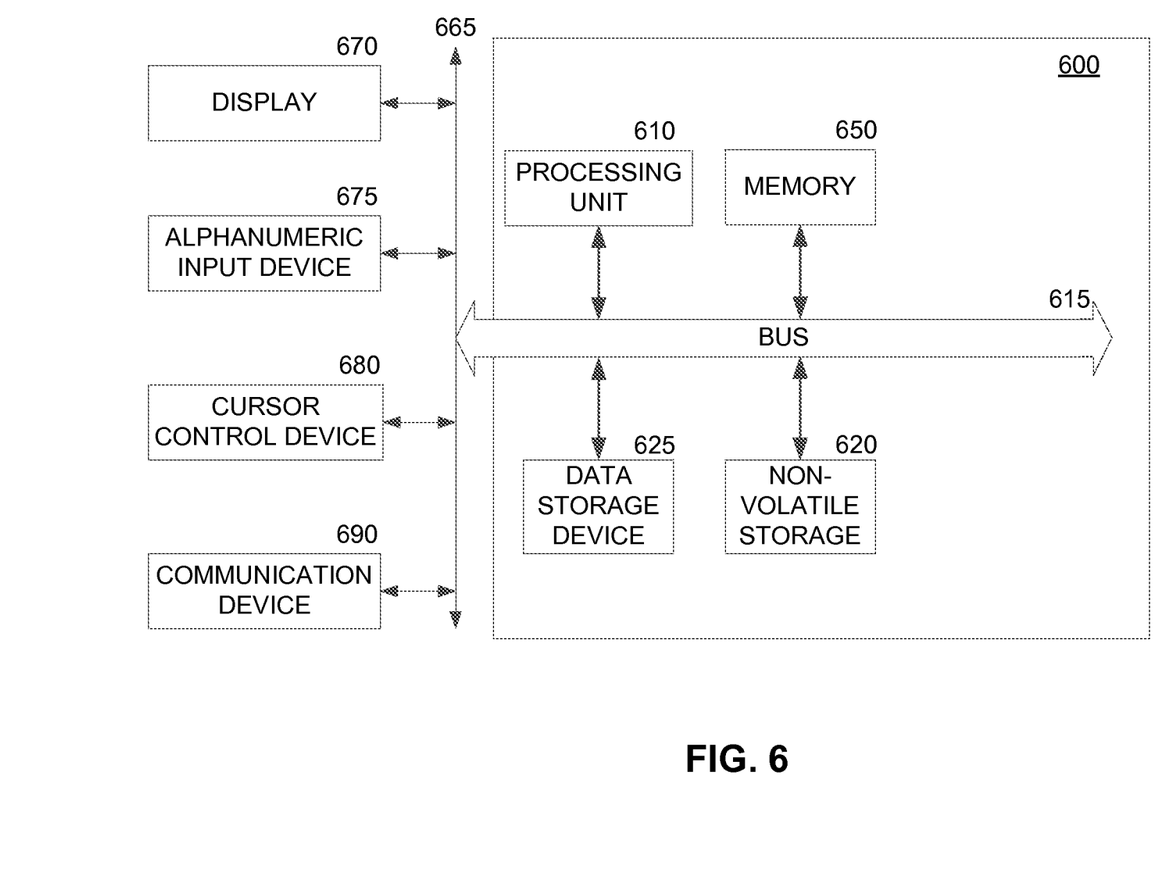
FIG. 6 is an illustration of components of a device to utilize an embodiment of the disclosure.

FIG. 6 is an illustration of components of a device to utilize an embodiment of the disclosure. Any combination of the components for platform 600 may be included in any of the head wearable displays described above. For example, platform 600 may comprise display driver components communicatively coupled to a head wearable display. Platform 600 may be used to decode/convert content into video signal formats such as high definition multimedia interface (HDMI), component, composite digital visual interface (DVI), video graphics adapter (VGA), Syndicat des Constructeurs d'Appareils Radiorecepteurs et Televiseursor (SCART), or other video signal formats.

Platform 600 as illustrated includes bus or other internal communication means 615 for communicating information, and processor 610 coupled to bus 615 for processing information. The platform further comprises random access memory (RAM) or other volatile storage device 650 (alternatively referred to herein as main memory), coupled to bus 615 for storing information and instructions to be executed by processor 610. Main memory 650 also may be used for storing temporary variables or other intermediate information during execution of instructions by processor 610. Platform 600 also comprises read only memory (ROM) and/or static storage device 620 coupled to bus 615 for storing static information and instructions for processor 610, and data storage device 625 such as a magnetic disk, optical disk and its corresponding disk drive, or a portable storage device (e.g., a universal serial bus (USB) flash drive, a Secure Digital (SD) card). Data storage device 625 is coupled to bus 615 for storing information and instructions.

Platform 600 may further be coupled to display device 670, such as a cathode ray tube (CRT) or an LCD coupled to bus 615 through bus 665 for displaying information to a computer user. Alphanumeric input device 675, including alphanumeric and other keys, may also be coupled to bus 615 through bus 665 (e.g., via infrared (IR) or radio frequency (RF) signals) for communicating information and command selections to processor 610. An additional user input device is cursor control device 680, such as a mouse, a trackball, stylus, or cursor direction keys coupled to bus 615 through bus 665 for communicating direction information and command selections to processor 610, and for controlling cursor movement on display device 670. In embodiments utilizing a touch-screen interface, it is understood that display 670, input device 675 and cursor control device 680 may all be integrated into a touch-screen unit.

Another device, which may optionally be coupled to platform 600, is a communication device 690 for accessing other nodes of a distributed system via a network. Communication device 690 may include any of a number of commercially available networking peripheral devices such as those used for coupling to an Ethernet, token ring, Internet, or wide area network. Communication device 690 may further be a null-modem connection, or any other mechanism that provides connectivity between computer system 600 and the outside world. Note that any or all of the components of this system illustrated in FIG. 6 and associated hardware may be used in various embodiments of the disclosure.

It will be appreciated by those of ordinary skill in the art that any configuration of the system illustrated in FIG. 6 may be used for various purposes according to the particular implementation. The control logic or software implementing embodiments of the disclosure can be stored in main memory 650, mass storage device 625, or other storage medium locally or remotely accessible to processor 610.

It will be apparent to those of ordinary skill in the art that any system, method, and process to capture media data as described herein can be implemented as software stored in main memory 650 or read only memory 620 and executed by processor 610. This control logic or software may also be resident on an article of manufacture comprising a computer readable medium having computer readable program code embodied therein and being readable the mass storage device 625 and for causing processor 610 to operate in accordance with the methods and teachings herein.

Embodiments of the disclosure may also be embodied in a handheld or portable device containing a subset of the computer hardware components described above and operatively coupled to eye sensing module or component. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a LCD or display element matrix for displaying information to a user of the handheld device. Conventional methods may be used to implement such a handheld device. The implementation of the disclosure for such a device would be apparent to one of ordinary skill in the art given the disclosure as provided herein.

Embodiments of the disclosure may also be embodied in a special purpose appliance including a subset of the computer hardware components described above. For example, the appliance may include processor 610, data storage device 625, bus 615, and memory 650, and only rudimentary communications mechanisms, such as a small touch-screen that permits the user to communicate in a basic manner with the device. In general, the more special-purpose the device is, the fewer of the elements need be present for the device to function.

Figure 7:
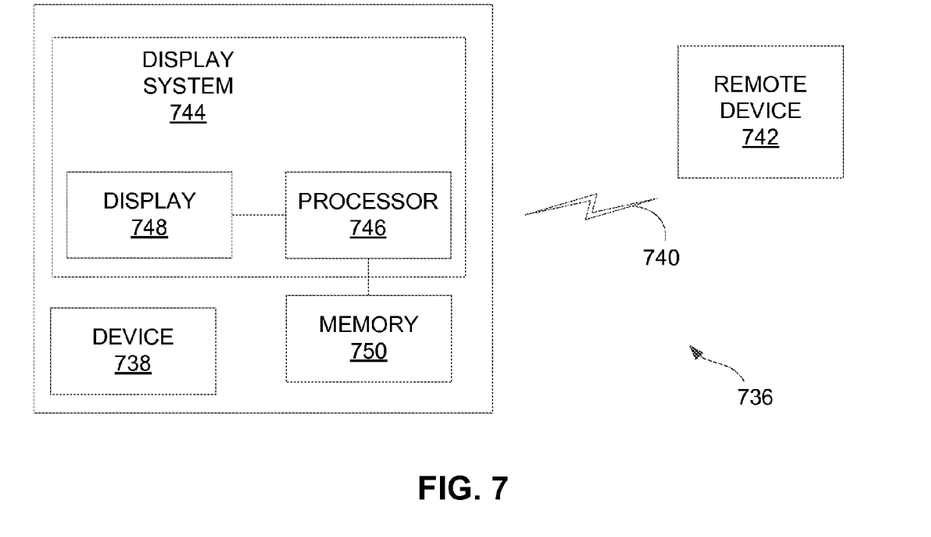
FIG. 7 is an illustration of an example computer network infrastructure for network accessible head wearable displays according to an embodiment of the disclosure.

FIG. 7 is an illustration of an example computer network infrastructure for network accessible head wearable displays according to an embodiment of the disclosure. In system 736, device 738 communicates using communication link 740 (e.g., a wired or wireless connection) to remote device 742. Device 738 may be any type of device that can receive data and display information corresponding to or associated with the data. For example, device 738 may be any of the head wearable displays described above.

Device 738 includes display system 744 comprising processor 746 and display 748. Display 748 may be, for example, an optical see-through display, an optical see-around display, or a video see-through display. Processor 746 may receive data from remote device 742, and configure the data for display. Processor 746 may be any type of processor, such as a micro-processor or a digital signal processor, for example.

Device 738 may further include on-board data storage, such as memory 750 coupled to processor 746. Memory 750 may store software that can be accessed and executed by processor 746, for example.

Remote device 742 may be any type of computing device or transmitter including a laptop computer, a mobile telephone, etc., that is configured to transmit data to device 738. Remote device 742 may include any of the eye sensing modules discussed above. Remote device 742 and device 738 may contain hardware to enable communication link 740, such as processors, transmitters, receivers, antennas, etc.

Communication link 740 is illustrated as a wireless connection; however, wired connections may also be used. For example, communication link 740 may be a wired link via a serial bus such as a universal serial bus or a parallel bus. A wired connection may be a proprietary connection as well. Communication link 740 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), among other possibilities. Remote device 742 may be accessible via the Internet and may comprise a computing cluster associated with a particular web service (e.g., social-networking, photo sharing, address book, etc.) to receive captured media data as described above.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent series of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion above, it is appreciated that throughout the description, discussions utilizing terms such as "capturing," "transmitting," "receiving," "parsing," "forming," "monitoring," "initiating," "performing," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "capturing", "determining", "analyzing", "driving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The algorithms and displays presented above are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout the above specification are not necessarily all referring to the same embodiment. Furthermore, the particular features, structures, or characteristics may be combined in any suitable manner in one or more embodiments.

The present description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the various embodiments with various modifications as may be suited to the particular use contemplated.

The invention claimed is:
1. A head wearable display comprising:
   at least one lens;
   at least one image source positioned in front of the at least one lens to generate light for the head wearable display;
   a frame assembly to support the at least one lens and the at least one image source for wearing on a head of a user; and
   an eye sensing module for positioning in front of a user's eye to capture image data of the user's eye comprising:
      at least one image sensor;
      a first focusing lens disposed over a first portion of the at least one image sensor, wherein the first focusing lens includes a first surface;
      a second focusing lens disposed over a second portion of the at least one image sensor, the second portion lateral to and different than the first portion, wherein the second focusing lens is a distinct and separate lens from the first focusing lens, wherein the second focusing lens includes a second surface;
wherein the first and second focusing lenses are positioned side-by-side so that the first and second surfaces are in a same plane, and wherein the first and second focusing lenses have different fields of view;
a first directional prism disposed over the first focusing lens to tilt a field of view of the first focusing lens along a first direction to focus on a first target area; and
a second directional prism disposed over the second focusing lens and positioned side-by-side with the first directional prism, to tilt a field of view of the second focusing lens along a second direction different than the first direction to focus on a second target area different than the first target area, wherein the first target area and the second target area in combination encompass a plurality of user eye regions, wherein the second directional prism does not tilt the field of view of the first focusing lens and the first directional prism does not tilt the field of view of the second focusing lens.

2. The head wearable display of claim 1, further comprising:
a processor to execute a plurality of operations including:
capturing a plurality of images via the eye sensing module, including a first image of the first target area and a second image of the second target area;
identifying one or more images from the plurality of images that do not include image data of the eye of the user;
discarding the identified one of more images that do not include image data of the eye of the user; and
identifying a user eye characteristic from one or more remaining images of the plurality of images.

3. The head wearable display of claim 2, wherein the identified user eye characteristic comprises a gaze direction, and identifying one or more images from the plurality of images that do not include image data of the eye of the user:
identifying one or more images from the plurality of images that do not include image data of an iris of the eye of the user.

4. The head wearable display of claim 2, wherein the identified user eye characteristic comprises an eye blink, and identifying one or more images from the plurality of images that do not include image data of the eye of the user includes:
identifying one or more images from the plurality of images that do not include image data of any portion of the eye of the user.

5. The head wearable display of claim 1, wherein the plurality of user eye regions comprises a plurality of horizontally offset eye regions.

6. The head wearable display of claim 1, wherein the plurality of user eye regions comprises a plurality of vertically offset user eye regions.

7. The head wearable display of claim 1, wherein the at least one image sensor of the eye sensing module of the head wearable display comprises a single image sensor.

8. The head wearable display of claim 1, wherein the at least one image sensor of the eye sensing module comprises a first image sensor and a second image sensor corresponding to the first focusing lens and the second focusing lens, respectively.

9. The head wearable display of claim 1, wherein the first target area at least partially overlaps the second target area.

10. The head wearable display of claim 1, wherein the first target area does not overlap the second target area.

11. The head wearable display of claim 1, wherein the head wearable display comprises an augmented reality (AR) display device.

12. The head wearable display of claim 1, wherein the head wearable display comprises a virtual reality (VR) display device.

13. An apparatus comprising:
at least one image sensor for positioning in front of a user's eye to capture image data of the user's eye;
a first focusing lens and a second focusing lens disposed over the at least one image sensor, wherein the first and second focusing lenses are disposed over different portions of the at least one image sensor, wherein the second focusing lens is a distinct and separate lens from the first focusing lens, wherein the first and second focusing lenses are positioned side-by-side and over respective first and second portions of the at least one image sensor, wherein a first surface of the first focusing lens is in a same plane as a second surface of the second focusing lens, and wherein the first and second focusing lenses have different fields of view; and
a first directional prism and a second directional prism disposed side-by-side and over the first focusing lens and the second focusing lens, respectively, such that a combination of the first focusing lens and the first directional prism forms a first optical path different than and in parallel with the second optical path formed by a combination of the second focusing lens and the second directional prism, the first directional prism to tilt the field of view of the first focusing lens along a first direction to focus on a first target area, the second directional prism to tilt the field of view of the second focusing lens along a second direction, different from the first direction, to focus on a second target area different than the first target area, wherein the first target area and the second target area in combination encompass a plurality of user eye regions, wherein the first and second target areas include different images, wherein the second directional prism does not tilt the field of view of the first focusing lens and the first directional prism does not tilt the field of view of the second focusing lens, and
wherein the image of the first target area is provided to a first portion of the at least one image sensor via the first optical path, and the image of the second target area is provided to a second portion of the at least one image sensor via the second optical path.

14. The apparatus of claim 13, wherein the plurality of user eye regions comprise a plurality of horizontally offset eye regions.

15. The apparatus of claim 13, wherein the plurality of user eye regions comprise a plurality of vertically offset user eye regions.

16. The apparatus of claim 13, wherein the at least one image sensor comprises a single image sensor.

17. The apparatus of claim 13, wherein the at least one image sensor comprises a first image sensor and a second image sensor corresponding to the first focusing lens and the second focusing lens, respectively.

18. The apparatus of claim 13, wherein the first target area at least partially overlaps the second target area.

19. The apparatus of claim 13, wherein the first target area does not overlap the second target area.

20. A non-transitory computer readable storage medium including instructions that, when executed by a processor, cause the processor to perform a method comprising:

capturing a plurality of images via an eye sensing module of a head wearable display, the plurality of images including a first image of a first target area and a second image of a second target area different than the first target area, the first and second images being different, wherein the first target area and the second target area in combination encompass a plurality of user eye regions, wherein the eye sensing module includes at least one image sensor having first and second focusing lenses that are separate and distinct, and first and second directional prisms, the first and second directional prisms disposed over the first and second focusing lenses, respectively, and the first and second focusing lenses arranged side-by-side so that a surface of each of the first and second focusing lenses are in a same plane and the first and second focusing lenses disposed over first and second different lateral portions, respectively, of the at least one image sensor, wherein the first directional prism provides the first image to the first lateral portion of the at least one image sensor and the second directional prism provides the second image to the second lateral portion of the at least one image sensor, and wherein the first directional prism does not tilt light incident on the second different lateral portion of the at least one image sensor and the second directional prism does not tilt light incident on the first different lateral portion of the at least one image sensor;

identifying one or more images from the plurality of images that do not include image data of an eye of a user of the head wearable display;

discarding the identified one or more images that do not include image data of the eye of the user; and identifying a user eye characteristic from one or more remaining images of the plurality of images.

21. The non-transitory computer readable storage medium of claim 20, wherein the identified user eye characteristic comprises a gaze direction, and identifying one or more images from the plurality of images that do not include image data of the eye of the user of the head wearable display includes:

identifying one or more images from the plurality of images do not include image data of an iris of the eye of the user.

22. The non-transitory computer readable storage medium of claim 20, wherein the identified user eye characteristic comprises an eye blink, and identifying one or more images from the plurality of images that do not include image data of the eye of the user of the head wearable display includes:

identifying one or more images from the plurality of images that do not include image data of any portion of the eye of the user.

* * * * *